United States Patent
Kwon

(10) Patent No.: US 8,462,245 B2
(45) Date of Patent: Jun. 11, 2013

(54) IMAGE SENSOR FOR MINIMIZING VARIATION OF CONTROL SIGNAL LEVEL

(75) Inventor: Oh-Bong Kwon, Chungcheongbuk-do (KR)

(73) Assignee: Intellectual Ventures II L.L.C., Wilmington, DE (US)

( * ) Notice: Subject to any disclaimer, the term of this patent is extended or adjusted under 35 U.S.C. 154(b) by 1631 days.

(21) Appl. No.: 11/293,617

(22) Filed: Dec. 1, 2005

(65) Prior Publication Data

US 2006/0119733 A1    Jun. 8, 2006

(30) Foreign Application Priority Data

Dec. 3, 2004 (KR) .................. 10-2004-0101337

(51) Int. Cl.
*H04N 3/14* (2006.01)
*H04N 5/335* (2011.01)
*H04N 5/217* (2011.01)
*H01L 27/00* (2006.01)

(52) U.S. Cl.
USPC ........... 348/308; 348/241; 348/294; 348/324; 250/208.1

(58) Field of Classification Search ........... 348/372, 348/222.1, 241, 294–324; 250/200, 208.1
See application file for complete search history.

(56) References Cited

U.S. PATENT DOCUMENTS

| | | | | |
|---|---|---|---|---|
| 6,674,471 | B1* | 1/2004 | Masuyama | 348/312 |
| 7,224,390 | B2* | 5/2007 | Kokubun et al. | 348/308 |
| 2001/0030699 | A1* | 10/2001 | Sakuragi | 348/302 |
| 2003/0146993 | A1* | 8/2003 | Kokubun et al. | 348/308 |
| 2004/0036008 | A1* | 2/2004 | Barna | 250/208.1 |
| 2005/0264664 | A1* | 12/2005 | Yanagisawa et al. | 348/308 |
| 2006/0119733 | A1* | 6/2006 | Kwon | 348/372 |
| 2007/0109437 | A1* | 5/2007 | Funaki et al. | 348/308 |
| 2007/0126902 | A1* | 6/2007 | Kuroda | 348/296 |

FOREIGN PATENT DOCUMENTS

KR    10-2004-0033366    4/2004

* cited by examiner

*Primary Examiner* — Michael Osinski
(74) *Attorney, Agent, or Firm* — McAndrews, Held & Malloy, Ltd.

(57) ABSTRACT

There is provided an image sensor capable of minimizing level variations of a control signal inputted to a unit pixel. The image sensor includes a plurality of unit pixels, each supplied with a first power voltage for converting an inputted signal into an electrical signal; and a control block supplied with a second power voltage for providing control signals to each unit pixel in order to stably operate each unit pixel, wherein the control block includes a conversion unit for outputting the control signals under the first power voltage, not the second power voltage.

10 Claims, 3 Drawing Sheets

IMAGE SENSOR FOR MINIMIZING VARIATION OF CONTROL SIGNAL LEVEL

FIELD OF THE INVENTION

The present invention relates to an image sensor; and, more particularly, to an image sensor for preventing an image quality from being deteriorated due to a level variation of a control signal provided to a unit pixel.

DESCRIPTION OF RELATED ART

As is well known, an image sensor is a semiconductor device for converting an optical image into an electrical signal. The image sensor is mainly classified into a charge coupled device (CCD) or a complementary metal oxide semiconductor (CMOS) image sensor.

In the CCD, each MOS capacitor is placed in close proximity and charge carriers are stored in and transferred.

On the contrary, the CMOS image sensor includes a plurality of unit pixels by employing a semiconductor CMOS process, wherein the unit pixel is provided with one photodiode and three or four transistors for driving the unit pixel. In the CMOS image sensor, there is employed a CMOS technology in which a control circuit and a signal processing circuit are used as a peripheral circuit, and a plurality of MOS transistors are prepared for driving the plurality of the unit pixels. Therefore, the CMOS image sensor is a device that employs a switching method for detecting an output successively by using the peripheral circuit and the MOS transistors.

In manufacturing various image sensors, many endeavors have been undertaken to improve photosensitivity of the image sensor, of which one is a light-condensing technology. For example, the CMOS image sensor is configured with the photodiode for sensing a light from an object and a CMOS logic circuitry for processing the light sensed at the photodiode into the electric signal and creating data corresponding to the electric signal. In order to improve the photosensitivity, many attempts have been made to enlarge an occupation ratio of a photodiode area with respect to a total area of the image sensor, which is typically called a fill factor.

FIG. 1 is a circuit diagram setting forth a unit pixel 100 of a conventional CMOS image sensor, in which one unit pixel includes four transistors.

In the unit pixel 100 of the conventional CMOS image sensor as depicted in FIG. 1, a sub-micron CMOS epitaxial process is applied in order to improve the photosensitivity and reduce a crosstalk between unit pixels.

As shown, the unit pixel 100 of the image sensor includes a photodiode PD constructing a PNP junction, a PNPN junction or the like, a transfer transistor TX, a floating diffusion node FD, a reset transistor RX, a drive transistor DX and a select transistor SX.

The photodiode PD receives the light from an object to generate corresponding electron-hole pairs, i.e., photogenerated charges. The transfer transistor TX transfers the photogenerated charges accumulated at the photodiode PD to the floating diffusion node FD when the transfer transistor TX is turned on. The floating diffusion node FD receives the photogenerated charges transferred from the transfer transistor TX when the transfer transistor TX is turned on. The reset transistor RX resets the floating diffusion node FD to be a power voltage VDD level in response to a reset signal. In the drive transistor DX, the amount of turning on a drive gate is varied with an electric signal corresponding to the photogenerated charges transferred from the floating diffusion node FD so that the drive transistor DX outputs the electric signal in proportion to the amount of the photogenerated charges. The select transistor SX, which is turned on according to a select signal, outputs a signal of the unit pixel 100 outputted through the drive transistor DX.

Herein, a denotation of LX represents a load transistor and the floating diffusion node FD has a predetermined capacitance Cfd.

An operational principle for achieving an output voltage VOUT from the unit pixel with the above configuration will be set forth more fully herebelow.

First, the transfer, the reset and the select transistors TX, RX and SX are turned off. At this time, the photodiode PD is in a fully depleted state. Light-condensing is started to collect the photogenerated charges at the photodiode PD.

After the floating diffusion node FD is reset as the reset transistor RX is turned on, the select transistor SX is turned on so as to measure a first output voltage V1 of the unit pixel 100 at a reset operation. This measured value means only a direct current (DC) voltage level shift of the floating diffusion node FD.

Thereafter, after an appropriate light-condensing time goes by, all the photogenerated charges at the photodiode PD are transferred to the floating diffusion node FD when the transfer transistor TX is turned on. Afterwards, the transfer transistor TX is turned off.

Next, a second output voltage V2 owing to the charges transferred to the floating diffusion node FD is measured.

Subsequently, the output voltage VOUT is obtained from a difference between the output voltages V1 and V2, i.e., (V1−V2), which is a transfer result of the photogenerated charges. That is, the output voltage VOUT is purely a signal voltage in which a noise is excluded. This method is referred to as a correlated double sampling (CDS).

Afterwards, the above processes are repeated.

FIG. 2 is a timing diagram setting forth an operation of the conventional CMOS image sensor.

As shown, when a reset signal R is transited to a logic low level from a logic high level, a reset data D1 is outputted after a first predetermined time t1. As a transfer signal T is transited to a logic low level from a logic high level, a light-condensed data D2 is outputted after a second predetermined time t2. Thereafter, both the reset signal R and the transfer signal T are in the logic high level for a period X so that the unit pixel is reset, i.e., cleaned up.

Meanwhile, the transfer signal T and the reset signal R are inputted to the gates of the transfer and the reset transistors TX and RX in the unit pixel structure of FIG. 1. The transfer signal T and the reset signal R, which are signals outputted from a decoder, take the roles of controlling the operation of the unit pixel.

Typically, since the decoder uses a power voltage of a digital block unlike the unit pixel in the image sensor, the power voltage is unstable and a variation of the power voltage is also large in comparison with a power voltage used for an analog block and the unit pixel.

An output terminal of the decoder is conventionally configured in an inverter structure that also uses the power voltage of the digital block.

In case that there is the variation of the power voltage at the output terminal of the decoder, there also occurs level variations of the transfer signal T and the reset signal R inputted to the unit pixel. In case of the image sensor employing a scanning type by a line unit, i.e., a row unit, the image sensor may take the same data for a different data at each line.

This is represented as a noise that an image seems to be scratched transversely so that it is very important to prevent the level variations of the transfer signal and the reset signal inputted to the unit pixel.

SUMMARY OF THE INVENTION

It is, therefore, an object of the present invention to provide an image sensor for minimizing level variations of a control signal inputted to a unit pixel.

In accordance with another aspect of the present invention, there is provided an image sensor including: a unit pixel, supplied with a first power voltage, including a photodiode, a transfer transistor, a reset transistor, a drive transistor, and a select transistor; and a control block supplied with a second power voltage for providing a transfer signal to a gate of the transfer transistor and a reset signal to a gate of the reset transistor, wherein the control block includes a conversion unit for outputting the transfer signal and the reset signal, which uses the first power voltage, not the second power voltage.

In accordance with another aspect of the present invention, there is provided an image sensor including: a unit pixel, supplied with a first power voltage, including a photodiode, a reset transistor, a drive transistor, and a select transistor; and a control block supplied with a second power voltage for providing a reset signal to a gate of the reset transistor, wherein the control block includes a conversion unit for outputting the reset signal, which uses the first power voltage, not the second power voltage.

In accordance with further another aspect of the present invention, there is provided an image sensor including: a unit pixel, supplied with a first power voltage, including a photodiode, a transfer transistor, a reset transistor, a drive transistor, and a select transistor; and a control block supplied with a second power voltage for providing a transfer signal to a gate of the transfer transistor and a reset signal to a gate of the reset transistor, wherein the control block includes a conversion unit for outputting the transfer signal and the reset signal, which uses the first power voltage, not the second power voltage.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

An image sensor for minimizing variation of control signal level in accordance with exemplary embodiments of the present invention will be described in detail with reference to the accompanying drawings.

Figure 1:
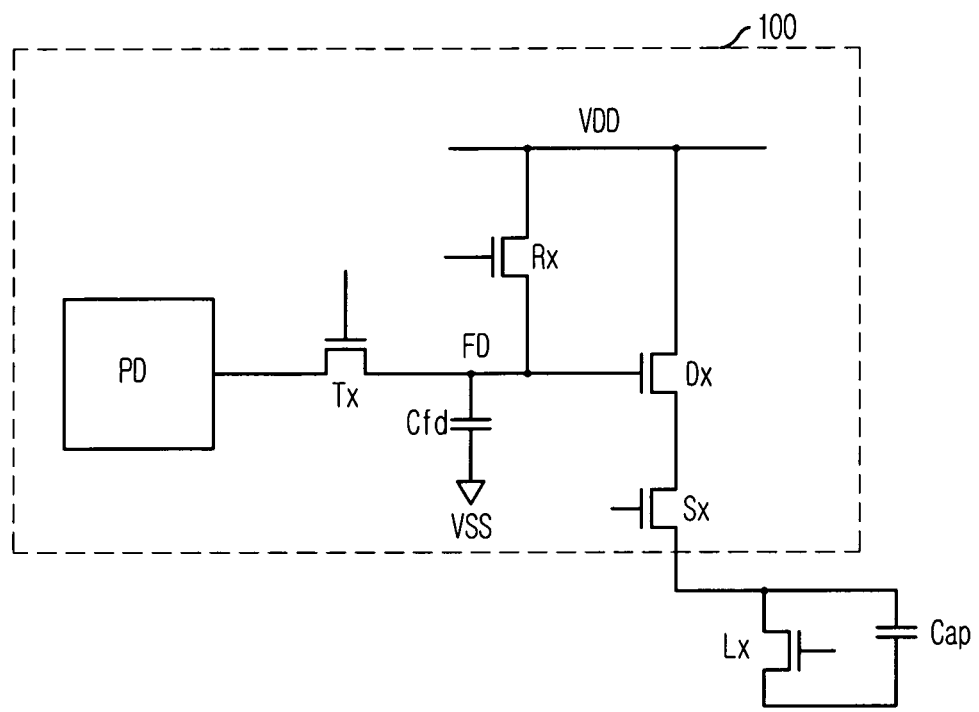
FIG. 1 is a circuit diagram setting forth a unit pixel of a conventional CMOS image sensor, in which one unit pixel includes four transistors.
Figure 2:
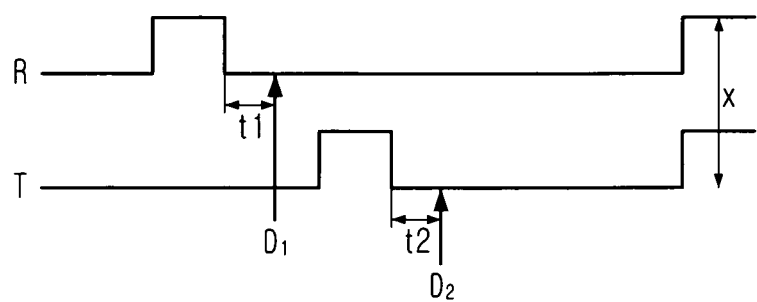
FIG. 2 is a timing diagram setting forth an operation of the conventional CMOS image sensor.
Figure 3:
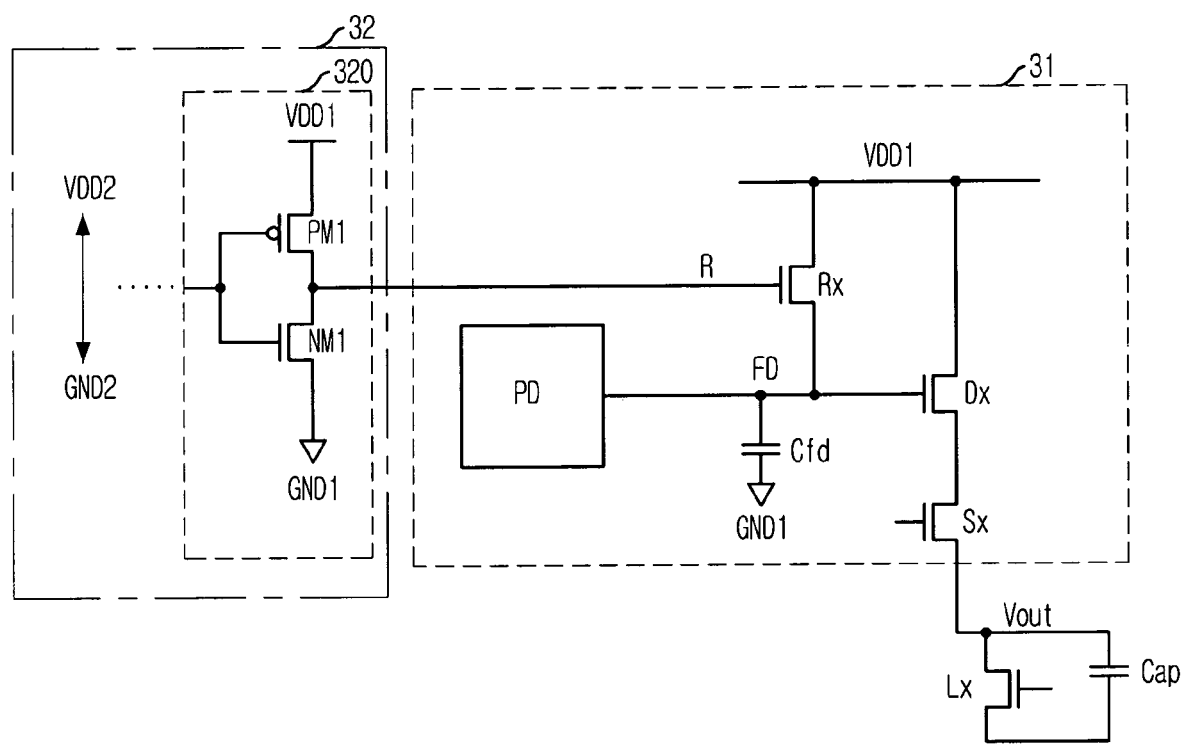
FIG. 3 is a circuit diagram setting forth an image sensor including three transistors in a unit pixel in accordance with an embodiment of the present invention.

FIG. 3 is a circuit diagram setting forth an image sensor including three transistors in a unit pixel in accordance with an embodiment of the present invention.

As shown, the image sensor of the present invention includes a unit pixel 31 provided with a photodiode PD, a reset transistor RX, a drive transistor DX and a select transistor SX, and a decoder 32 providing a reset signal R to a gate of the reset transistor RX. An end output terminal 320 of the decoder 32, which outputs the reset signal, uses the same first power voltage VDD1 with the unit pixel 31. Herein, the unit pixel 31 and the end output terminal of the decoder 32 use the first power voltage VDD1 of an analog block, whereas the decoder 32 except the end output terminal 320 uses a second power voltage VDD2 of a digital block.

Therefore, since the first power voltage VDD1 is stable at the end output terminal 320 of the decoder 32, a level variation of the output signal, i.e., the reset signal R, is hardly generated. Herein, the end output terminal 320 is configured in an inverter structure having two transistors PM1 and NM1. Thus, when scanning the image sensor by a line unit, there does not occur data variation with respect to the same data at each line so that it is possible to prevent an image quality from being deteriorated.

The photodiode PD receives a light from an object to generate corresponding photogenerated charges. The floating diffusion node FD receives the photogenerated charges from the photodiode PD. The reset transistor RX resets the floating diffusion node FD to be a power voltage VDD level according to the reset signal R. In the drive transistor DX, the amount of turning on a drive gate is varied with an electric signal corresponding to the photogenerated charges transferred from the floating diffusion node FD so that the drive transistor DX outputs the electric signal in proportion to the amount of the photogenerated charges. The select transistor SX, which is turned on according to a select signal, outputs a signal of the unit pixel outputted through the drive transistor DX. Herein, a denotation of LX represents a load transistor and the floating diffusion node FD has a predetermined capacitance Cfd.

Figure 4:
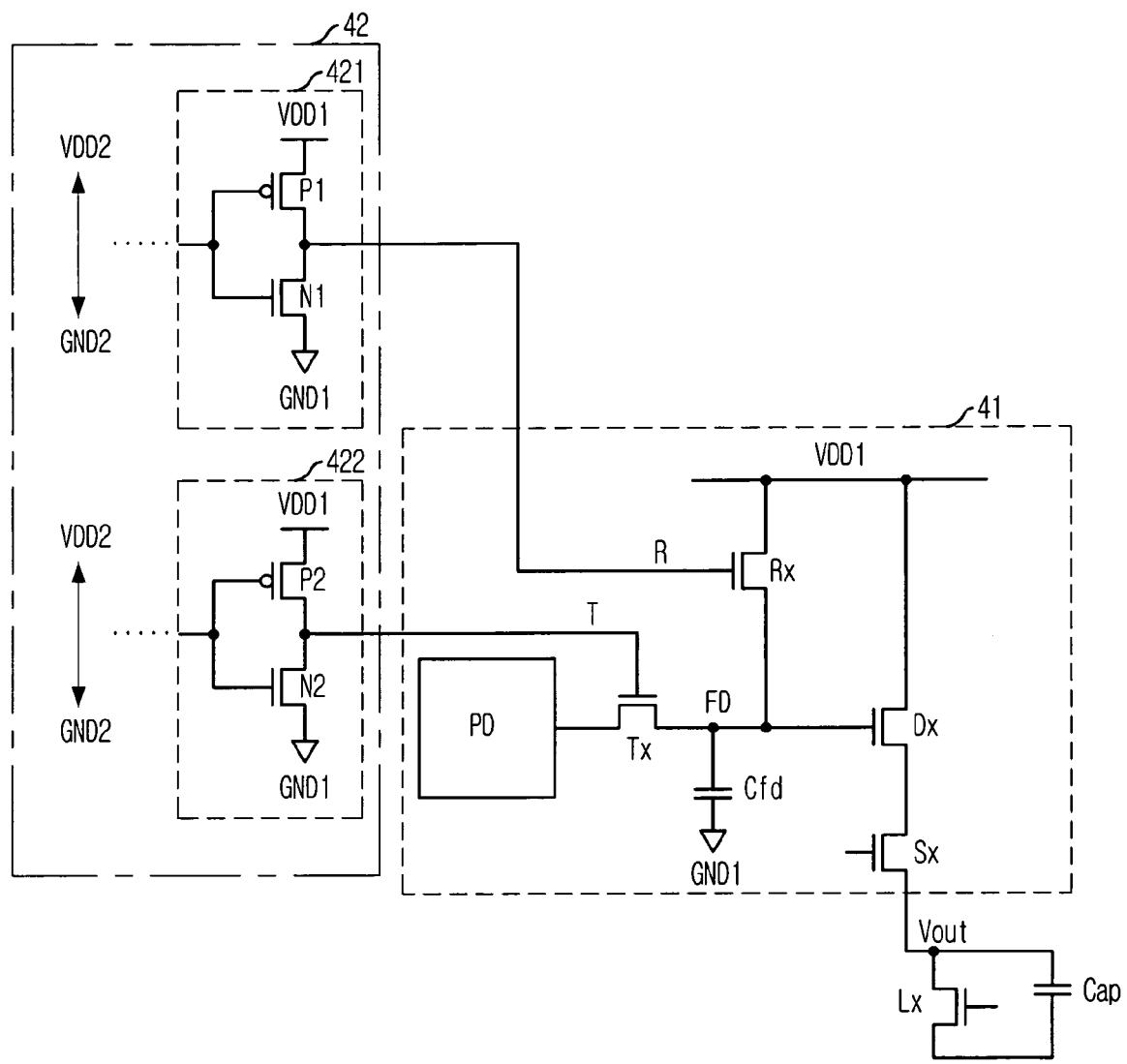
FIG. 4 is a circuit diagram setting forth an image sensor including four transistors in a unit pixel in accordance with another embodiment of the present invention.

FIG. 4 is a circuit diagram setting forth an image sensor including four transistors in a unit pixel in accordance with another embodiment of the present invention.

Referring to FIG. 4, the image sensor of the present invention includes a unit pixel 41 provided with a photodiode PD, a transfer transistor TX, a reset transistor RX, a drive transistor DX and a select transistor SX, and a decoder 42 providing a transfer signal T and a reset signal R to gates of the transfer transistor TX and the reset transistor RX, respectively. A first end output terminal 421 and a second end output terminal 422 of the decoder 42, which output the transfer signal and the reset signal respectively, use the same first power voltage VDDI with the unit pixel 41. Herein, the unit pixel 41, the first end output terminal 421 and the second end output terminal 422 of the decoder 42 use the first power voltage VDDI of an analog block, whereas the decoder 42 except the first end output terminal 421 and the second end output terminal 422 use a second power voltage VDD2 of a digital block.

Therefore, since the first power voltage VDD1 is stable at the first end output terminal 421 and the second end output terminal 422 of the decoder 42, level variations of the output signals, i.e., the transfer signal T and the reset signal R, are hardly generated. Herein, each of the first end output terminal 421 and the second end output terminal 422 is configured in an inverter structure having two transistors P1 and N1, and P2 and N2, respectively.

Accordingly, when scanning the image sensor by line unit, there does not occur data variation with respect to the same data at each line so that it is possible to prevent an image quality from being deteriorated.

Herein, the transfer transistor TX takes the role of transferring the photogenerated charges accumulated at the photodiode PD to the floating diffusion node FD when the transfer transistor TX is turned on in response to the transfer signal T. Meanwhile, since the image sensor of FIG. 4 is similar in the constitution and the elements to the image sensor of FIG. 3 except the transfer transistor TX, further descriptions for the same elements described already will be omitted herein.

In the embodiments, the end output terminal of the decoder is configured with an inverter structure for illustrative purpose, the other device having various shapes such as a resistor, a transistor, a differential amplifier or the like may be applied to the output terminal.

In accordance with the embodiments of the present invention, it is possible to prevent the image quality from being deteriorated because the end output terminal of the decoder uses the same power voltage with the unit pixel without any level variation, wherein the end output terminal of the decoder outputs the control signal applied to the unit pixel.

As described above, since it is possible to prevent the image quality from being deteriorated, the present invention is effective for enhancing a performance of the image sensor.

The present application contains subject matter related to the Korean patent application No. KR 2004-101337, filed in the Korean Patent Office on Dec. 3, 2004, the entire contents of which are incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An image sensor for reducing variation of control signal level, the image sensor comprising:
   a unit pixel supplied with a first power voltage and configured to convert an inputted signal into an electrical signal; and
   a control block supplied with both the first power voltage and a second power voltage, wherein the control block is configured to provide a control signal to the unit pixel;
   wherein the first and second power voltages are different;
   wherein the control block includes a conversion unit configured to receive a signal under the second power voltage, to receive the first power voltage, and to output the control signal under the first power voltage;
   wherein the first power voltage is supplied from an analog block, and wherein the second power voltage is supplied from a digital block; and
   wherein the conversion unit includes at least one of an inverter structure, a resistor, a transistor, or a differential amplifier.

2. The image sensor of claim 1, wherein the unit pixel comprises a photodiode, a reset transistor, a drive transistor, and a select transistor.

3. The image sensor of claim 2, wherein the control block is further configured to provide a reset signal to a gate of the reset transistor.

4. The image sensor of claim 1, wherein the conversion unit comprises a PMOS transistor and an NMOS transistor, both connected in series between the first power voltage and a first ground voltage, and wherein the gates of the transistors are connected to each other.

5. The image sensor of claim 1, wherein the unit pixel comprises a photodiode, a transfer transistor, a reset transistor, a drive transistor, and a select transistor.

6. The image sensor of claim 5, wherein the control block is further configured to provide a transfer signal to a gate of the transfer transistor and a reset signal to a gate of the reset transistor.

7. The image sensor of claim 6, wherein the unit pixel and the conversion unit are configured to use a power voltage of an analog block as the first power voltage, and wherein the control block, except the conversion unit, is configured to use a power voltage of a digital block as the second power voltage.

8. The image sensor of claim 7, wherein the conversion unit comprises:
   a first conversion unit configured to output the transfer signal to the gate of the transfer transistor; and
   a second conversion unit configured to output the reset signal to the gate of the reset transistor.

9. The image sensor of claim 8, wherein the first conversion unit comprises an inverter structure.

10. The image sensor of claim 9, wherein the first conversion unit comprises a PMOS transistor and an NMOS transistor, both connected in series between the first power voltage and a first ground voltage, and wherein a gate of the PMOS transistor and a gate of the NMOS transistor are connected to each other.

* * * * *

UNITED STATES PATENT AND TRADEMARK OFFICE
CERTIFICATE OF CORRECTION

| | | |
|---|---|---|
| PATENT NO. | : 8,462,245 B2 | Page 1 of 1 |
| APPLICATION NO. | : 11/293617 | |
| DATED | : June 11, 2013 | |
| INVENTOR(S) | : Kwon | |

It is certified that error appears in the above-identified patent and that said Letters Patent is hereby corrected as shown below:

In the Specification

In Column 4, Line 52, delete "VDDI" and insert -- VDD1 --, therefor.

In Column 4, Line 54, delete "VDDI" and insert -- VDD1 --, therefor.

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,462,245 B2 | Page 1 of 1 |
| APPLICATION NO. | : 11/293617 | |
| DATED | : June 11, 2013 | |
| INVENTOR(S) | : Kwon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1797 days.

Signed and Sealed this
Thirtieth Day of December, 2014

Michelle K. Lee
*Deputy Director of the United States Patent and Trademark Office*